(12) United States Patent
Thompson et al.

(10) Patent No.: US 6,247,274 B1
(45) Date of Patent: *Jun. 19, 2001

(54) UNITIZED SEISMIC BRACKET WITH STRENGTH BEND

(75) Inventors: William J. Thompson, Fullerton; Keith L. Watkins, Yorba Linda, both of CA (US)

(73) Assignee: Tomarco Contractor Specialties, Inc., Buena Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/496,970

(22) Filed: Feb. 2, 2000

Related U.S. Application Data

(63) Continuation-in-part of application No. 09/161,968, filed on Sep. 28, 1998, now Pat. No. 6,050,035.

(51) Int. Cl.[7] ....................................................... E04B 1/38
(52) U.S. Cl. ............................... 52/167.1; 52/39; 52/713; 403/71; 403/119; 403/220; 403/260; 248/59; 248/351; 248/638
(58) Field of Search .......................... 52/39, 713, 167.1; 403/71, 119, 209, 220, 243, 260, 262; 248/59, 351, 354.1, 638

(56) References Cited

U.S. PATENT DOCUMENTS

| | | | |
|---|---|---|---|
| 1,132,999 | | 3/1915 | Beers . |
| 1,302,727 | * | 5/1919 | Thomas .................................. 52/713 |
| 3,353,312 | * | 11/1967 | Storch .................................... 52/713 |
| 3,861,104 | * | 1/1975 | Bower ................................. 52/713 X |
| 4,004,768 | * | 1/1977 | Evans et al. ............................ 248/59 |
| 4,065,218 | * | 12/1977 | Biggane ................................ 403/71 |
| 4,078,752 | | 3/1978 | Kindorf . |
| 4,296,576 | * | 10/1981 | Rice, Jr. et al. .................... 52/713 X |
| 4,297,763 | * | 11/1981 | Lautenschlager ............... 403/119 X |
| 4,309,019 | * | 1/1982 | Bloom ............................. 248/59 X |
| 5,145,132 | | 9/1992 | Kirschner . |
| 5,188,317 | | 2/1993 | Roth . |
| 5,307,752 | | 5/1994 | Perrault et al. . |
| 5,412,843 | | 5/1995 | Krongauz et al. . |
| 5,435,661 | * | 7/1995 | Zmyslowski et al. .......... 403/119 X |
| 5,566,915 | * | 10/1996 | Hansare ........................... 248/351 X |

* cited by examiner

*Primary Examiner*—Carl D. Friedman
*Assistant Examiner*—Brian E. Glessner
(74) *Attorney, Agent, or Firm*—Price and Gess

(57) ABSTRACT

A seismic brace having a brace arm for fastening to a support rod on one end and a structural portion of a building, on the other end, is attachable to the support rod without disconnecting it by a base bracket hinged to the brace arm and a locking bracket hinged to the brace arm or the base bracket to overlay the base bracket. Both the base bracket and locking bracket have a slot extending from an edge towards the middle with one slot offset form the other by ninety degrees (90°). The base bracket is bent at an angle of 45° from the horizontal which provides extra strength and resistance to lifting from the horizontal according to I.C.B.O. tests. The locking bracket has a conforming bend.

24 Claims, 2 Drawing Sheets

UNITIZED SEISMIC BRACKET WITH STRENGTH BEND

CROSS-REFERENCE TO RELATED APPLICATIONS

This application is a continuation-in-part of application Ser. No. 09/161,968, filed on Sep. 28, 1998, now U.S. Pat. No. 6,050,035 granted on Apr. 18, 2000, for a Unitized Seismic Bracket.

BACKGROUND OF THE INVENTION

1. Field of the Invention

Today's commercial buildings use hangers suspended by rods from the underside of the floor above to run pipes, electrical cables, HVAC ducts, communication lines, etc. A seismic brace is used in buildings to prevent adverse sway or movement in the event of an earthquake. Those braces keep the various independent elements of such suspended items within a building intact during an earthquake. Without seismic brackets, the independent elements, like pipe hangers, for example, will move independently. This independent movement can result in the pipes suspended in these hangers to break away from their installed positions causing damage or at least inoperable conditions.

2. Description of Related Art

Various types of seismic braces are in current use, each having multiple parts or requiring various degrees of effort and time to install. For example, U.S. Pat. No. 4,065,218 shows a one piece seismic brace having a first channel iron that connects to a building element hinged to a second channel iron which attaches to the item supported. This brace takes considerable time to install because the fastener of the supported element must be completely undone to attach this brace.

U.S. Pat. No. 5,188,317 shows a brace for a hanger for pipes, electrical cables or the like. The hanger is suspended from a series of rods attached to the overhead floor. This brace uses a separate detached interlock element so that the brace may be attached to the rod without completely removing a hanger from its supporting rod. The interlock element must mate with the rod connecting end in a precise manner to function correctly. Incorrect use of the detached interlock piece, use of an incorrectly sized interlock piece, or simply not using it, will result in insufficient restraint, or the brace coming loose during earthquake induced movement.

None of the prior art seismic braces achieve or fulfills the purpose of the present invention in providing a one piece seismic connector with an integral, built-in interlock construction that does not require disconnecting the hanger from its support rod to attach the connector end to the rod in addition to surprising strength and lift resistance under extreme force.

SUMMARY OF THE INVENTION

The present invention relates to a one piece bracket used to construct a brace assembly which is applied to a hanging support system for utility and service lines to prevent or eliminate the oscillations that develop in such hanging systems when subjected to earthquakes or various types of natural or man-made vibrations. A brace arm is attached to a base bracket by a hinge. A locking bracket is hinged to the base bracket at either end of the base bracket. The base bracket and locking bracket are slotted in different directions to capture vertical support rods. The slots are open ended, and oppose each other at a right angle. When the two brackets overlap they capture the vertical support rod. The one piece brace of the present invention attaches to an already installed system without disassembly of the hanger. Due to the unitized construction of the bracket, ease of assembly, inability to lose a detached piece and correct connection of the brace to the rod, are provided. By bending the base bracket and locking bracket at matching forty-five degrees from the horizontal, the assembly is provided with substantial and, surprising additional strength to resist lifting forces from the horizontal.

BRIEF DESCRIPTION OF THE DRAWINGS

Further aspects of the invention will be apparent when the description and claims set forth below are considered in conjunction with the accompanying drawings, in which like-reference numerals depict like part throughout the drawings.

DETAILED DESCRIPTION OF THE PREFERRED EMBODIMENTS

The following description is provided to enable any person skilled in the art to make and use the invention and sets forth the best modes, contemplated by the inventor, for carrying out his invention.

The particular invention is intended for use with suspended utility systems, including, but not limited to, individual pipes and conduit, pipe racks and conduit racks, cable trays, bus ducts, HVAC ducts, mechanical equipment, fans and ceiling grids and is specifically intended to provide seismic restraint of these systems.

The complete disclosure of application Ser. No. 09/161,968, filed on Sep. 28, 1998, for a Unitized Seismic Bracket now U.S. Pat. No. 6,050,035 granted on Apr. 18, 2000 of which this application is a continuation-in-part is incorporated by reference herein as if fully set forth hereat.

Figure 1:
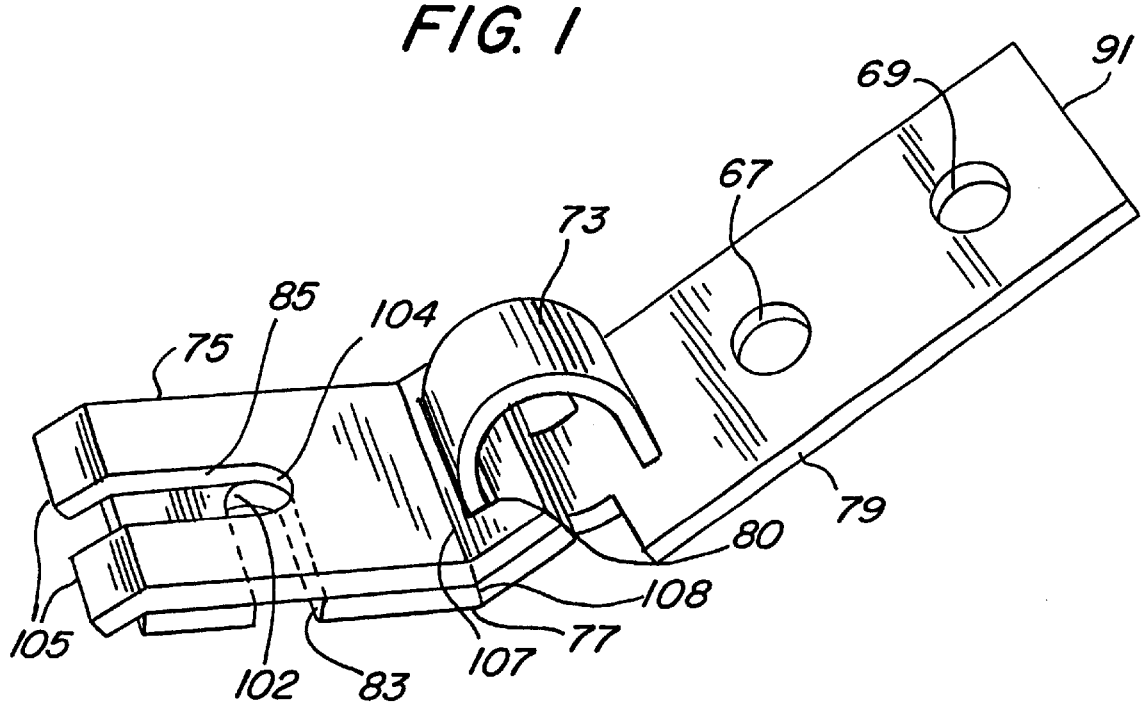
FIG. 1 is a perspective view of a one piece seismic brace of the present invention.
Figure 3:
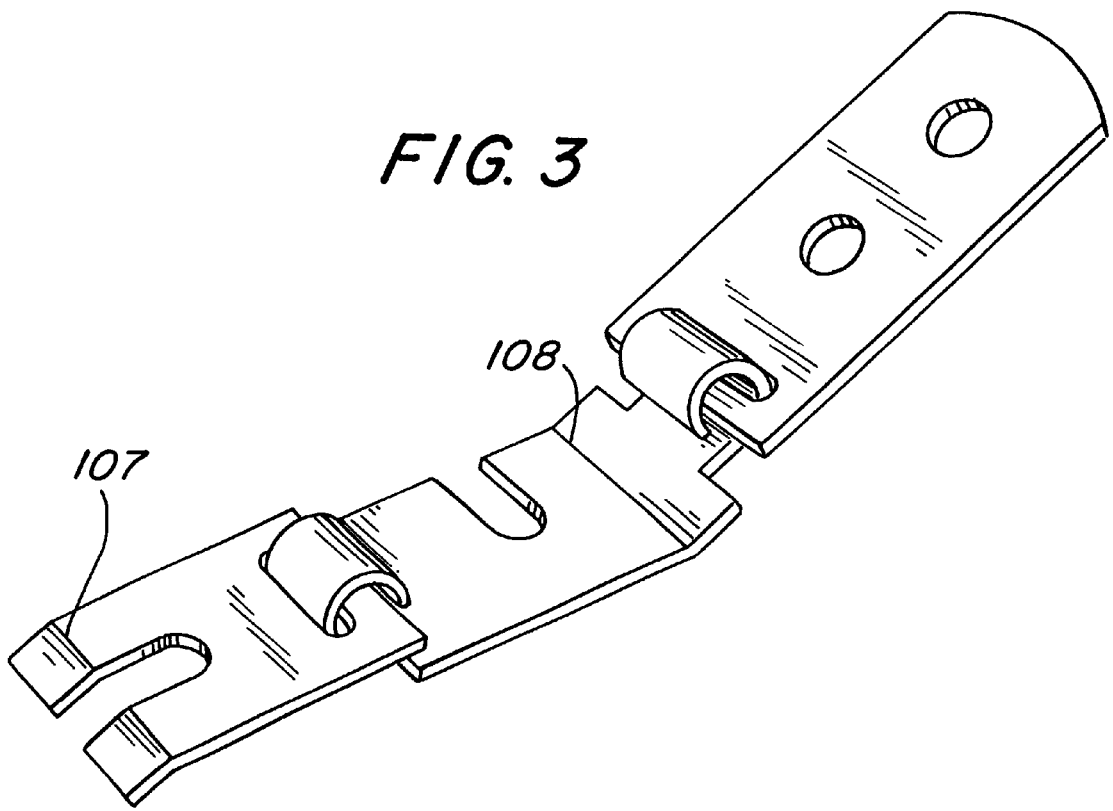
FIG. 3 is a perspective view of an alternate embodiment of the seismic brace of the present invention.

FIG. 1 shows the brace of FIG. 3 of application Ser. No. 09/161,968 with the improvement according to the present invention of a bend 107 in the locking bracket 75 and a conforming bend 108 in the base bracket 77. This bend which may vary from 20° to 80° from the horizontal, but is preferably at 45° from the horizontal, is placed below the slot 80 in the locking bracket 75 and the slot (not shown) of the base bracket 77.

During tests administered to the brace shown in FIG. 1 by applying a force to bracket arm 79, it was demonstrated that the bend in base bracket 77 and in locking bracket 75 produced considerable and surprisingly greater force factors without allowing movement of the base and locking bracket from the horizontal, according to standard I.C.B.O. tests.

FIG. 3 shows the brace of FIG. 1 of U.S. Pat. No. 6,050,035 with the improvement according to the present invention of a bend 108 in the base bracket and a conforming bend 107 in the locking bracket.

Figure 2:
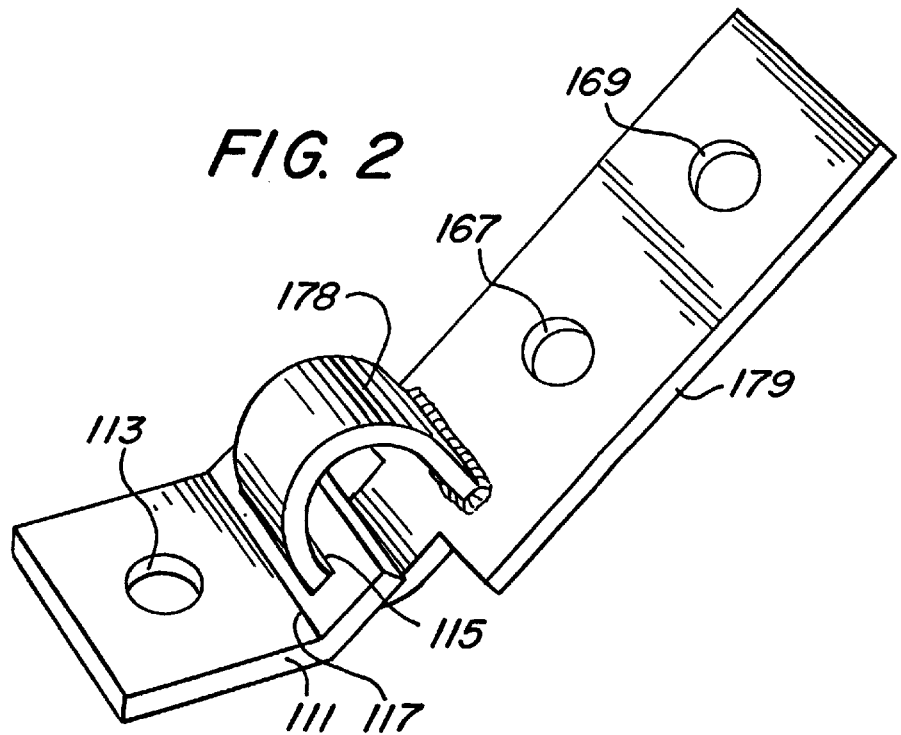
FIG. 2 is a perspective view of an alternate embodiment of the one-piece seismic brace of the present invention.

The brace shown in FIG. 2 is used for overhead attachment of the channel 41 or tubular member 49, as shown in FIG. 2 of application Ser. No. 09/161,968. The brace of FIG. 2 has a hinge 173 on bracket arm 179, which passes through a slot 115 on the base bracket 111. Base bracket 111 has an aperture 113 therein to facilitate fastening to the overhead floor. The bracket arm 179 has several apertures 167 and 169, for example, to facilitate fastening to a channel 41 or tubular member 49, for example.

The bend 117 in base bracket 111 may range from 20° to 80° from the horizontal and is preferably at 45° from the horizontal. As a result of this bend the brace of FIG. 2 is capable of withstanding considerably more force at bracket arm 179 without lifting of base bracket 111 from the horizontal then was heretofore possible with out the bend, according to standard I.C.B.O. tests.

Having illustrated and described a preferred embodiment as well as variants of this invention, it will be obvious to those skilled in the art that further changes and modifications may become apparent. Such changes and modifications are not to affect this instant concept and are to be considered within the scope of this invention.

What is claimed is:

1. A brace to prevent sway between a support and a structure during movement of the structure and support from seismic activity, the brace comprising:

a brace arm having a first and second end, wherein the first end is adapted to extend from the support, and the second end is adapted to connect the brace arm to an element which is connected to the structure;

a base bracket, having a first and second end, flexibly and permanently attached to the first end of the brace arm by its first end, said base bracket having an opening extending from an edge towards a center of the base bracket said base bracket being bent at an angle away from the horizontal at its first end; and a locking bracket, having a first and second end, flexibly and permanently attached to the second end of the base bracket by its first end, said locking bracket having an opening therein extending from an edge towards a center of the locking bracket;

said locking bracket being bent to conform to the bend in the base bracket whereby when the locking bracket overlays the base bracket the opening of the locking bracket and the base bracket form an opening which is adapted to completely enclose the support;.

2. The brace of claim 1 wherein the opening in said base bracket is a slot having a width wherein the width is adapted to be slightly larger than the diameter of the support and wherein the opening in said locking bracket is a slot having a width wherein the width is adapted to be slightly larger than the diameter of the support and wherein the main axis of the slot is at ninety degrees to the main axis of the slot in the base bracket.

3. The brace of claim 1 wherein the base bracket is flexibly and permanently attached to the brace arm by a hinge arrangement formed out of the base bracket and brace arm, and wherein the locking bracket and base bracket are flexibly and permanently attached by a hinge arrangement formed out of the locking bracket and base bracket.

4. The brace of claim 3 wherein the opening in said base bracket is a slot having a width wherein the width is adapted to be slightly larger than the diameter of the support and wherein the opening in said locking bracket is a slot having a width wherein the width is adapted to be slightly larger than the diameter of the support and wherein the main axis of the slot is at ninety degrees to the main axis of the slot in the base bracket.

5. The brace of claim 1 wherein the bend in the base bracket is at an angle between 20° and 80°.

6. The brace of claim 1 wherein the bend in the base bracket is at an angle of 45°.

7. A brace to prevent sway between a support and a structure during movement of the structure and support from seismic activity, the brace comprising:

a brace arm, having a first and second end, wherein the first end is adapted to extend from the support, and the second end is adapted to connect the brace arm to an element which is connected to the structure;

a base bracket, having a first and second end, flexibly and permanently attached to the first end of the brace arm, by its first end, said base bracket having an opening extending from an edge towards a center of the base bracket, said base bracket being bent at an angle away from the horizontal at its first end; and a locking bracket, having a first end and second end, flexibly and permanently attached to the first end of the brace arm, by its first end, said base bracket having an opening extending from an edge towards a center of the locking bracket, said locking bracket being bent at an angle to conform to the bend in the base bracket;

whereby when the locking bracket overlays the base bracket, the opening of the locking bracket and the opening of the base bracket form an opening which is adapted to completely enclose the support.

8. The brace of claim 7 wherein the opening in said base bracket is a slot having a width wherein the width is adapted to be slightly larger than the diameter of the support and wherein the opening in said locking bracket is a slot having a width wherein the width is adapted to be slightly larger than the diameter of the support and wherein the main axis is at ninety degrees to the main axis of the slot in the base bracket.

9. The brace of claim 7 wherein the base bracket is flexibly and permanently attached to the brace arm by a hinge arrangement formed out of the base bracket and brace arm, and wherein the locking bracket and brace arm are flexibly and permanently attached by a hinge arrangement formed out of the locking bracket and brace arm.

10. The brace of claim 9 wherein the opening in said base bracket is a slot having a width wherein the width is adapted to be slightly larger than the diameter of the support and wherein the opening in said locking bracket is a slot having a width wherein the width is adapted to be slightly larger than the diameter of the support and wherein the main axis is at ninety degrees to the main axis of the slot in the base bracket.

11. The brace of claim 7 wherein the bend in the base bracket is at an angle between 20° and 80°.

12. The brace of claim 7 wherein the bend in the base bracket is at an angle of 45°.

13. A brace to prevent sway between a support and a structure during movement of the structure and support from seismic activity, the brace comprising:

a brace arm having a first and second end, wherein the first end is adapted to extend from the support, and the second end is adapted to connect the brace arm to an element which is connected to the structure;

a base bracket, having a first and second end, flexibly attached to the first end of the brace arm by its first end, said base bracket having an opening extending from an edge towards a center of the base bracket; and a locking bracket, having a first and second end, flexibly attached to the second end of the base bracket by its first end, said locking bracket having an opening therein extending from an edge towards a center of the locking bracket;

whereby when the locking bracket overlays the base bracket the opening of the locking bracket and the base bracket form an opening which is adapted to completely enclose the support.

14. The brace of claim 13 wherein the opening in said base bracket is a slot having a width adapted to be slightly larger than the diameter of the support and wherein the opening in said locking bracket is a slot having a width adapted to be slightly larger than the diameter of the support and wherein the main axis of the slot is at ninety degrees to the main axis of the slot in the base bracket.

15. The brace of claim 13 wherein the base bracket is flexibly attached to the brace arm by a hinge arrangement formed out of the base bracket and brace arm, and wherein the locking bracket and base bracket are flexibly attached by a hinge arrangement formed out of the locking bracket and base bracket.

16. The brace of claim 15 wherein the opening in said base bracket is a slot having a width adapted to be slightly larger than the diameter of the support and wherein the opening in said locking bracket is a slot having a width adapted to be slightly larger than the diameter of the support and wherein the main axis of the slot is at ninety degrees to the main axis of the slot in the base bracket.

17. A brace to prevent sway between a support and a structure during movement of the structure and support from seismic activity, the brace comprising:

a brace arm, having a first and second end, wherein the first end is adapted to extend from the support, and the second end is adapted to connect the brace arm to an element which is connected to the structure;

a base bracket, having a first and second end, flexibly attached to the first end of the brace arm, by its first end, said base bracket having an opening extending from an edge towards a center of the base bracket; and a locking bracket having a first end and second end, flexibly attached to the first end of the base arm, by its first end, said base bracket having an opening extending from an edge towards a center of the locking bracket;

whereby when the locking bracket overlays the base bracket, the opening of the locking bracket and the opening of the base bracket form an opening which is adapted to completely enclose the support.

18. The brace of claim 17 wherein the opening in said base bracket is a slot having a width adapted to be slightly larger than the diameter of the support and wherein the opening in said locking bracket is a slot having a width adapted to be slightly larger than the diameter of the support and wherein the main axis is at ninety degrees to the main axis of the slot in the base bracket.

19. The brace of claim 17 wherein the base bracket is flexibly attached to the brace arm by a hinge arrangement formed out of the base bracket and brace arm, and wherein the locking bracket and brace arm are flexibly attached by a hinge arrangement formed out of the locking bracket and brace arm.

20. The brace of claim 19 wherein the opening in said base bracket is a slot having a width adapted to be slightly larger than the diameter of the support and wherein the opening in said locking bracket is a slot having a width adapted to be slightly larger than the diameter of the support and wherein the main axis of the slot is at ninety degrees to the main axis of the slot in the base bracket.

21. A brace to prevent sway between a support and a structure during movement of the structure and support from seismic activity, the brace comprising:

a brace arm having a first and second end, wherein the first end is adapted to extend from the support, and the second end is adapted to connect the brace arm to an element which is connected to the structure;

a base bracket, having a first and second end, hinged to the first end of the brace arm by its first end, said base bracket having an opening extending from an edge towards a center of the base bracket; and a locking bracket, having a first and second end, hinged to the second end of the base bracket by its first end, said locking bracket having an opening therein extending from an edge towards a center of the locking bracket;

whereby when the locking bracket overlays the base bracket the opening of the locking bracket and the base bracket form an opening which is adapted to completely enclose the support.

22. The brace of claim 21 wherein the opening in said base bracket is a slot having a width adapted to be slightly larger than the diameter of the support and wherein the opening in said locking bracket is a slot having a width adapted to be slightly larger than the diameter of the support and wherein the main axis of the slot is at ninety degrees to the main axis of the slot in the base bracket.

23. A brace to prevent sway between a support and a structure during movement of the structure and support from seismic activity, the brace comprising:

a brace arm, having a first and second end, wherein the first end is adapted to extend from the support, and the second end is adapted to connect the brace arm to an element which is connected to the structure;

a base bracket, having a first and second end, hinged to the first end of the brace arm, by its first end, said base bracket having an opening extending from an edge towards a center of the base bracket; and a locking bracket, having a first end and second end, hinged to the first end of the brace arm, by its first end, said locking bracket having an opening extending from an edge towards a center of the locking bracket;

whereby when the locking bracket overlays the base bracket, the opening of the locking bracket and the opening of the base bracket form an opening which is adapted to completely enclose the support.

24. The brace of claim 23 wherein the opening in said base bracket is a slot having a width adapted to be slightly larger than the diameter of the support and wherein the opening in said locking bracket is a slot having a width adapted to be slightly larger than the diameter of the support and wherein the main axis of the slot is at ninety degrees to the main axis of the slot in the base bracket.

* * * * *

UNITED STATES PATENT AND TRADEMARK OFFICE
CERTIFICATE OF CORRECTION

PATENT NO.    : 6,247,274 B1
DATED         : June 19, 2001
INVENTOR(S)   : William J. Thompson, Keith L. Watkins It is certified that error appears in the above-identified patent and that said Letters Patent is hereby corrected as shown below:

<u>Column 4, Claim 7,</u>
Line 26, after " said" delete [base] and insert -- locking --;

<u>Column 5, Claim 17,</u>
Line 36, before "arm" delete [base] and insert -- brace --;
Line 37, after "said" delete [base] and insert -- locking --;

<u>Abstract,</u>
Line 8, after "offset" delete [form] and insert -- from --.

Signed and Sealed this

Thirtieth Day of October, 2001

Attest:

NICHOLAS P. GODICI
*Attesting Officer*   *Acting Director of the United States Patent and Trademark Office*

UNITED STATES PATENT AND TRADEMARK OFFICE
CERTIFICATE OF CORRECTION

PATENT NO. : 6,247,274 B1
DATED : June 19, 2001
INVENTOR(S) : William J. Thompson, Keith L. Watkins It is certified that error appears in the above-identified patent and that said Letters Patent is hereby corrected as shown below:

Column 4, claim 7,
Line 16, after "said" delete [base] and insert -- locking --;

Column 5, claim 17,
Line 36, before "arm" delete [base] and insert -- brace --;
Line 37, after "said" delete [base] and insert -- locking --;

ABSTRACT,
Line 8, after "offset" delete [form] and insert -- from --.

This Certificate supercedes certificate of correction issued October 30, 2001.

Signed and Sealed this

Twenty-seventh Day of November, 2001

*Attest:*

*Attesting Officer*

NICHOLAS P. GODICI
*Acting Director of the United States Patent and Trademark Office*

EX PARTE REEXAMINATION CERTIFICATE (5442nd)

United States Patent
Thompson et al.

(10) Number: US 6,247,274 C1
(45) Certificate Issued: *Jul. 4, 2006

(54) UNITIZED SEISMIC BRACKET WITH STRENGTH BEND

(75) Inventors: William J. Thompson, Fullerton, CA (US); Keith L. Watkins, Yorba Linda, CA (US)

(73) Assignee: Tomarco Contractor Specialities, Inc., Buena Park, CA (US)

Reexamination Request:
No. 90/006,702, Jul. 10, 2003

Reexamination Certificate for:
Patent No.: 6,247,274
Issued: Jun. 19, 2001
Appl. No.: 09/496,970
Filed: Feb. 2, 2000

(*) Notice: This patent is subject to a terminal disclaimer.

Certificate of Correction issued Oct. 30, 2001.

Certificate of Correction issued Nov. 27, 2001.

Related U.S. Application Data

(63) Continuation-in-part of application No. 09/161,968, filed on Sep. 28, 1998, now Pat. No. 6,050,035.

(51) Int. Cl.
*E04B 1/38* (2006.01)

(52) U.S. Cl. .................. 52/167.1; 52/39; 52/713; 403/71; 403/119; 403/220; 403/260; 248/351; 248/638; 248/59

(58) Field of Classification Search .................. None
See application file for complete search history.

(56) References Cited

U.S. PATENT DOCUMENTS

| | | | | |
|---|---|---|---|---|
| 1,132,999 A | * | 3/1915 | Beers | 248/62 |
| 1,302,727 A | * | 5/1919 | Thomas | 52/713 |
| 3,353,312 A | * | 11/1967 | Storch | 52/713 |
| 3,377,038 A | * | 4/1968 | Loudon | 248/59 |
| 3,861,104 A | * | 1/1975 | Bower | 52/283 |
| 4,004,768 A | * | 1/1977 | Evans et al. | 248/59 |
| 4,065,218 A | * | 12/1977 | Biggane | 403/71 |
| 4,078,752 A | * | 3/1978 | Kindorf | 248/62 |
| 4,296,576 A | * | 10/1981 | Rice et al. | 52/92.2 |
| 4,297,763 A | * | 11/1981 | Lautenschlager | 16/363 |
| 4,309,019 A | * | 1/1982 | Bloom | 248/610 |
| 4,524,936 A | * | 6/1985 | Hurtubise | 248/62 |
| 4,634,327 A | * | 1/1987 | Kowalski | 411/432 |
| 4,709,889 A | * | 12/1987 | Erickson | 248/74.5 |
| 5,145,132 A | * | 9/1992 | Kirschner | 248/59 |
| 5,188,317 A | * | 2/1993 | Roth | 248/59 |
| 5,307,752 A | * | 5/1994 | Perrault et al. | 114/221 R |
| 5,412,843 A | * | 5/1995 | Krongauz et al. | 16/387 |
| 5,435,661 A | * | 7/1995 | Zmyslowski et al. | 403/79 |
| 5,566,915 A | * | 10/1996 | Hansare | 248/188.8 |
| 5,699,993 A | | 12/1997 | Hill et al. | 248/680 |
| 6,050,035 A | * | 4/2000 | Thompson et al. | 52/167.1 |
| 6,247,274 B1 | * | 6/2001 | Thompson et al. | 52/167.1 |
| 6,415,560 B1 | * | 7/2002 | Rinderer | 52/167.1 |
| 6,421,965 B1 | * | 7/2002 | Thompson et al. | 52/167.1 |
| 2002/0001501 A1 | * | 1/2002 | Thompson et al. | 403/102 |
| 2004/0020140 A1 | * | 2/2004 | Allmon et al. | 52/167.1 |

OTHER PUBLICATIONS

Letter dated May 28, 2003 from Brenton Babcock to Albin Gess with enclosed documents relating to sale of Kwik Klamp device, numbered D00895–D00910.

* cited by examiner

*Primary Examiner*—Robert Canfield

(57) ABSTRACT

A seismic brace having a brace arm for fastening to a support rod on one end and a structural portion of a building, on the other end, is attachable to the support rod without disconnecting it by a base bracket hinged to the brace arm and a locking bracket hinged to the brace arm or the base bracket to overlay the base bracket. Both the base bracket and locking bracket have a slot extending from an edge towards the middle with one slot offset from the other by ninety degrees (90°). The base bracket is bent at an angle of 45° from the horizontal which provides extra strength and resistance to lifting from the horizontal according to I.C.B.O. tests. The locking bracket has a conforming bend.

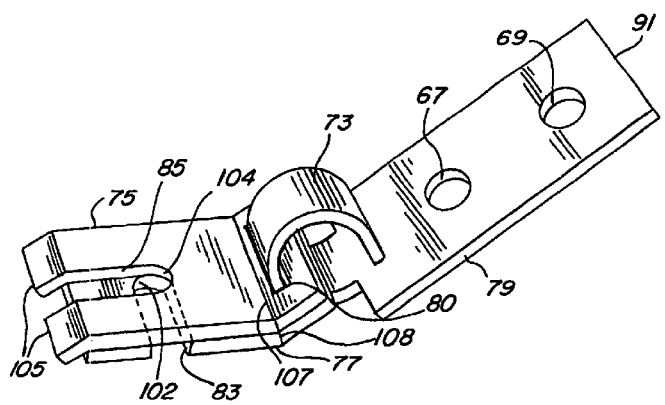

EX PARTE REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1–24 is confirmed.

* * * * *